(12) United States Patent
Martz et al.

(10) Patent No.: US 12,070,721 B1
(45) Date of Patent: Aug. 27, 2024

(54) ENGINE COLD START SYSTEM AND METHOD

(71) Applicant: Ford Global Technologies, LLC, Dearborn, MI (US)

(72) Inventors: Jason Martz, Canton, MI (US); Paul Joseph Tennison, West Bloomfield, MI (US); Brien Fulton, Bloomfield Hills, MI (US); Michiel J. Van Nieuwstadt, Ann Arbor, MI (US); Eric Kurtz, Dearborn, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 18/479,993

(22) Filed: Oct. 3, 2023

(51) Int. Cl.
| | |
|---|---|
| *B01D 53/94* | (2006.01) |
| *F01N 3/10* | (2006.01) |
| *F01N 3/20* | (2006.01) |
| *F01N 3/28* | (2006.01) |
| *F01N 3/32* | (2006.01) |
| *F01N 3/36* | (2006.01) |
| *F02D 41/02* | (2006.01) |

(52) U.S. Cl.
CPC ..... *B01D 53/9495* (2013.01); *B01D 53/9418* (2013.01); *B01D 53/9431* (2013.01); *B01D 53/944* (2013.01); *F01N 3/106* (2013.01); *F01N 3/2013* (2013.01); *F01N 3/2066* (2013.01); *F01N 3/2892* (2013.01); *F01N 3/32* (2013.01); *F01N 3/36* (2013.01); *F02D 41/024* (2013.01); *B01D 2251/2067* (2013.01); *B01D 2255/1023* (2013.01); *B01D 2255/50* (2013.01); *B01D 2255/91* (2013.01); *B01D 2257/404* (2013.01); *B01D 2258/012* (2013.01); *F01N 2610/02* (2013.01); *F01N 2610/1453* (2013.01); *F01N 2900/08* (2013.01); *F01N 2900/1402* (2013.01); *F01N 2900/1602* (2013.01)

(58) Field of Classification Search
CPC ........... B01D 53/9418; B01D 53/9431; B01D 53/944; B01D 53/9495; B01D 2251/2067; B01D 2255/1023; B01D 2255/50; B01D 2255/91; B01D 2257/404; B01D 2258/012; F01N 3/106; F01N 3/2013; F01N 3/2066; F01N 3/2892; F01N 3/32; F01N 3/36; F01N 2610/02; F01N 2610/1453; F01N 2900/08; F01N 2900/1402; F01N 2900/1602; F02D 41/024; Y02T 10/12; Y02T 10/40
See application file for complete search history.

(56) References Cited

U.S. PATENT DOCUMENTS

| | | | | | |
|---|---|---|---|---|---|
| 4,281,512 | A | * | 8/1981 | Mills | F01N 3/032 96/400 |
| 5,353,591 | A | * | 10/1994 | Kabasin | F23N 5/203 60/274 |
| 8,404,011 | B2 | * | 3/2013 | Doring | F01N 3/22 422/177 |

(Continued)

*Primary Examiner* — Dapinder Singh
(74) *Attorney, Agent, or Firm* — Vincent Mastrogiacomo; McCoy Russell LLP (57) ABSTRACT

Methods and systems for reducing emissions of an internal combustion engine are described. In one example, a combustor is applied post shutdown to purge stored NOx from a passive NOx absorber to prepare for a subsequent engine start. The trapped NOx is subsequently reduced via a selective catalytic reduction catalyst.

8 Claims, 5 Drawing Sheets

(56) References Cited

U.S. PATENT DOCUMENTS

| | | | | |
|---|---|---|---|---|
| 8,549,845 B2* | 10/2013 | Iwamoto | ............ | B01J 29/7615 |
| | | | | 60/289 |
| 2005/0011184 A1* | 1/2005 | Price | ................ | F02B 37/164 |
| | | | | 60/289 |
| 2009/0308057 A1* | 12/2009 | Fresnet | ............. | F01N 3/0885 |
| | | | | 60/287 |

* cited by examiner

ENGINE COLD START SYSTEM AND METHOD

FIELD

The present description relates generally to methods and systems for cold starting an internal combustion engine.

BACKGROUND/SUMMARY

Cold start emissions of an internal combustion engine may contribute a significant portion of emissions that exit a tailpipe of a vehicle. An engine may be operated in a way that increases engine heat output so that engine after treatment devices may activate sooner after a cold engine start, but even with engine operating adjustments, tailpipe emissions may be higher than desired. One way to increase operating temperatures of engine after treatment devices even sooner may be to apply a combustor in parallel with the engine. However, the combustor may generate its own emissions that may contribute to vehicle tailpipe emissions. Therefore, it may be desirable to provide an emissions control system that may warm an engine after treatment system with the speed of a system that includes a combustor, but generates lower tailpipe emissions.

The inventors herein have recognized the above-mentioned disadvantages and have developed an exhaust system for an internal combustion engine, comprising: a combustor air pump selectively supplying air to a combustor positioned along a first passage; a second passage arranged in parallel with the first passage; a three-way valve coupled to the first passage and the second passage downstream of the combustor; a third passage positioned downstream of the three-way valve; a fourth passage positioned in parallel with the third passage, the third passage and the fourth passage fluidically coupled to a fifth passage, the fifth passage fluidically coupled to an engine exhaust passage; a passive NOx absorber (PNA) positioned along the engine exhaust passage; a selective catalyst reduction (SCR) catalyst positioned along the engine exhaust passage downstream of the PNA; and a NOx sensor positioned along the engine exhaust passage downstream of the SCR.

By equipping a vehicle with a combustor, an electric heater, an oxidation catalyst, and a passive NOx absorber (PNA), it may be possible to provide the technical result of quickly heating after treatment devices in an engine exhaust passage and NOx generated by the combustor in the PNA so that the NOx may be reduced at a later time when the downstream SCR is activated. Consequently, the combustor may heat engine after treatment devices quicker so that engine starting may occur sooner and so that less NOx generated by the combustor may exit a vehicle tail pipe.

The present description may provide several advantages. In particular, the approach may lower tailpipe emissions via processing combustor emissions. In addition, the approach may enable low engine emission starting sooner after requesting engine after treatment device pre-heating. Further, the approach provides a way of purging a PNA during after an engine shutdown request so that the PNA may be prepared to store NOx during a subsequent engine restart.

The above advantages and other advantages, and features of the present description will be readily apparent from the following Detailed Description when taken alone or in connection with the accompanying drawings.

It is to be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
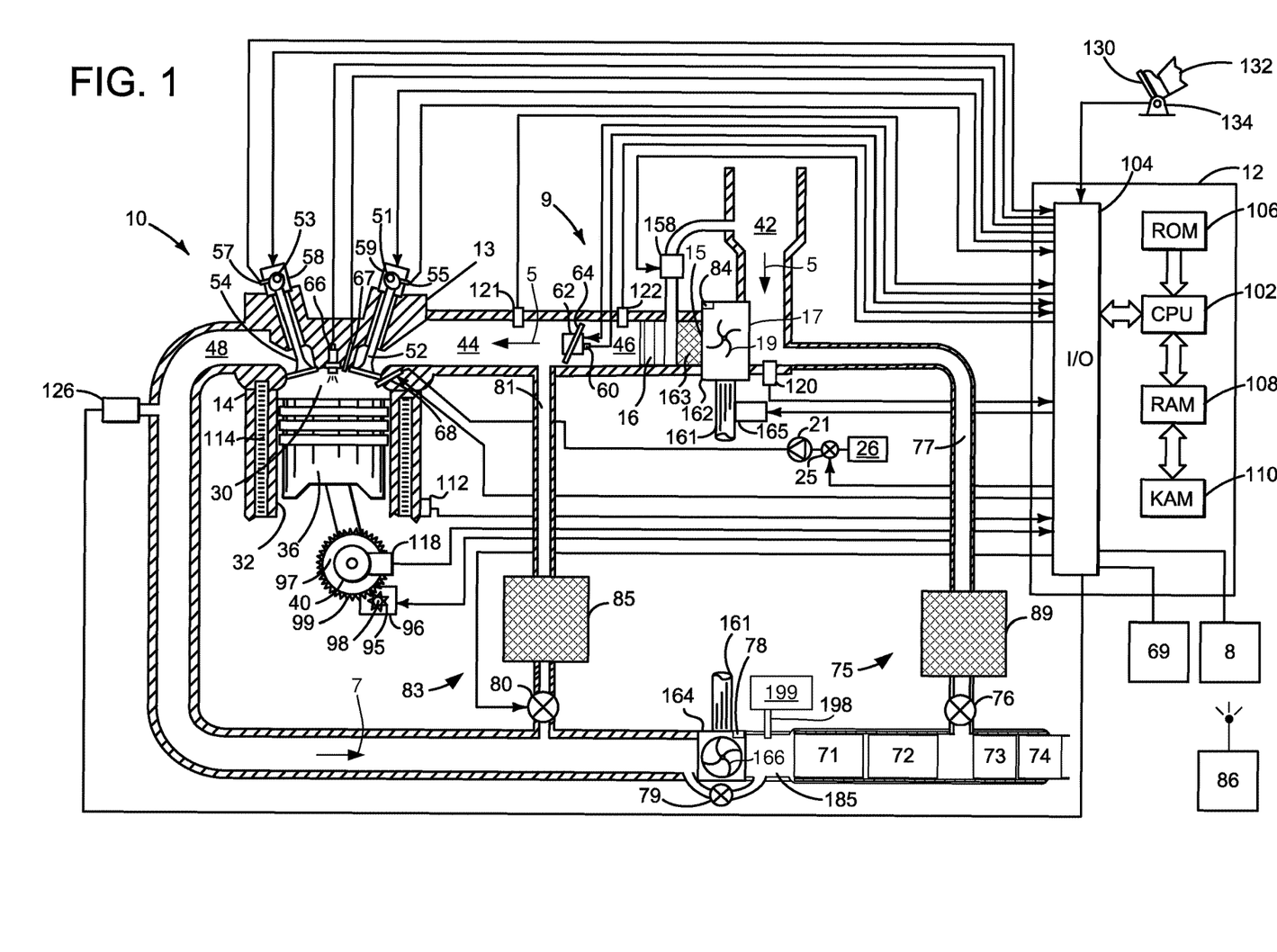
FIG. 1 shows a detailed schematic depiction of an example engine.
Figure 2:
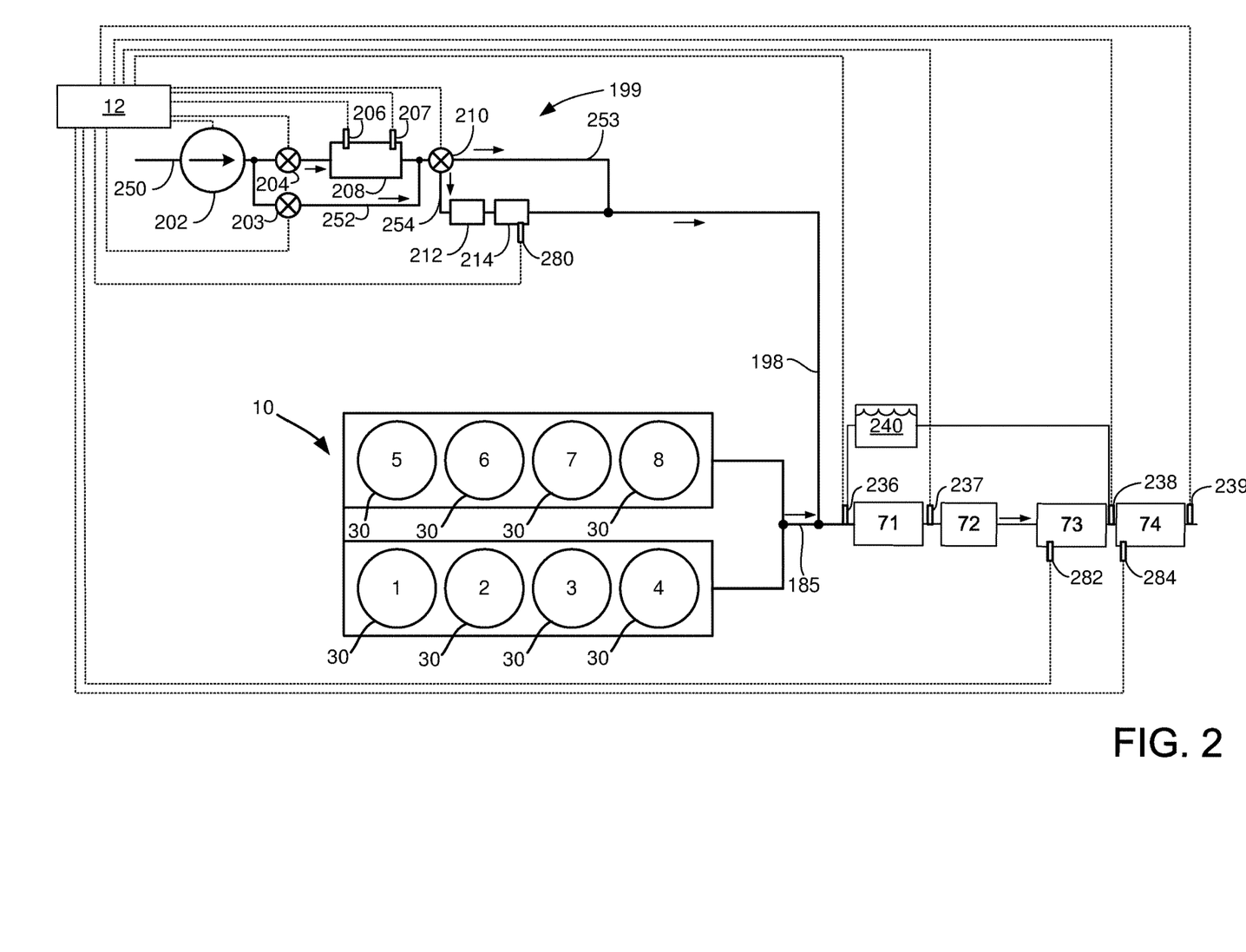
FIG. 2 shows a schematic view of an example exhaust system configurations for the example engine of FIG. 1.
Figure 3:
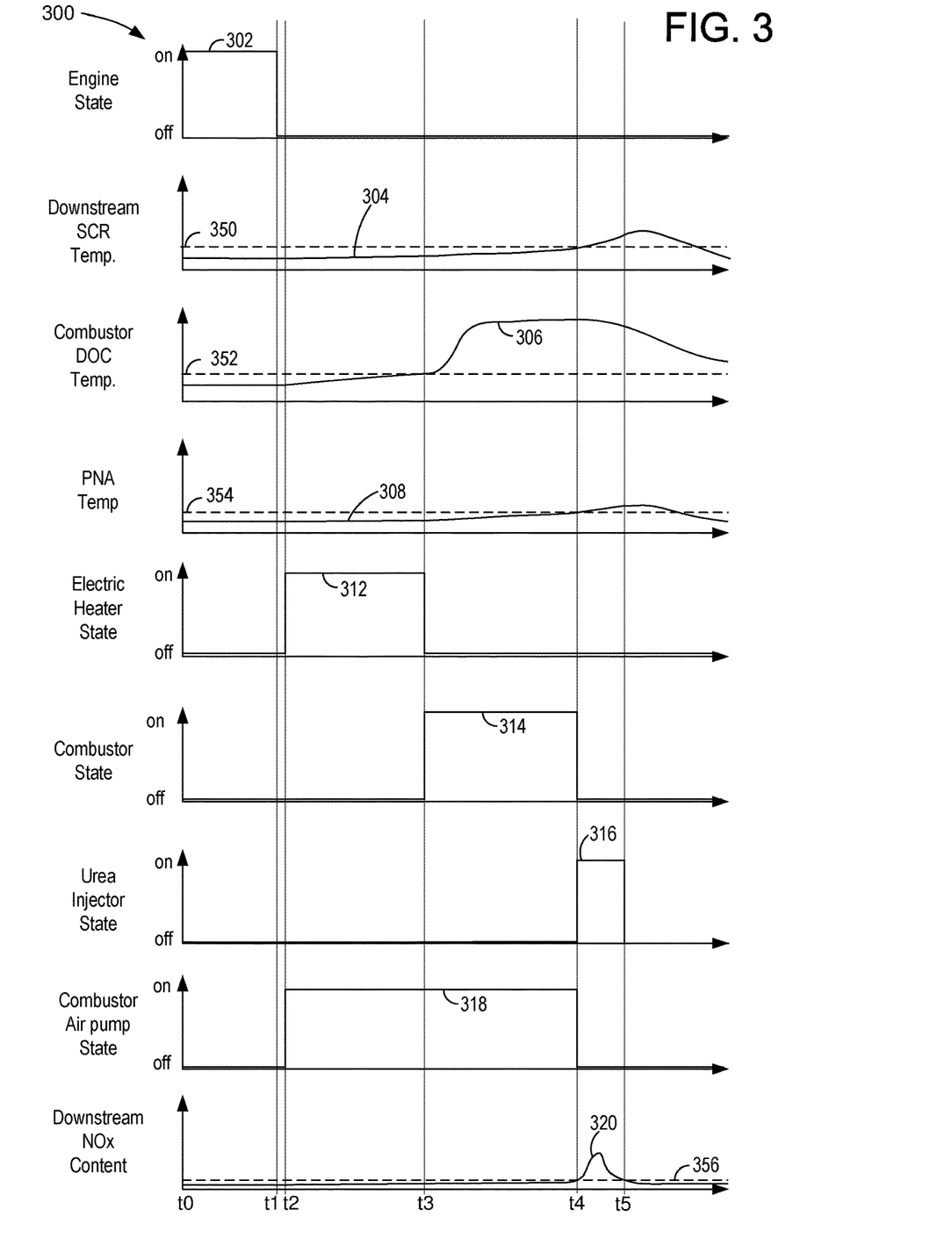
FIG. 3 shows an example operating sequence according to the method of FIG. 4.
Figure 4:
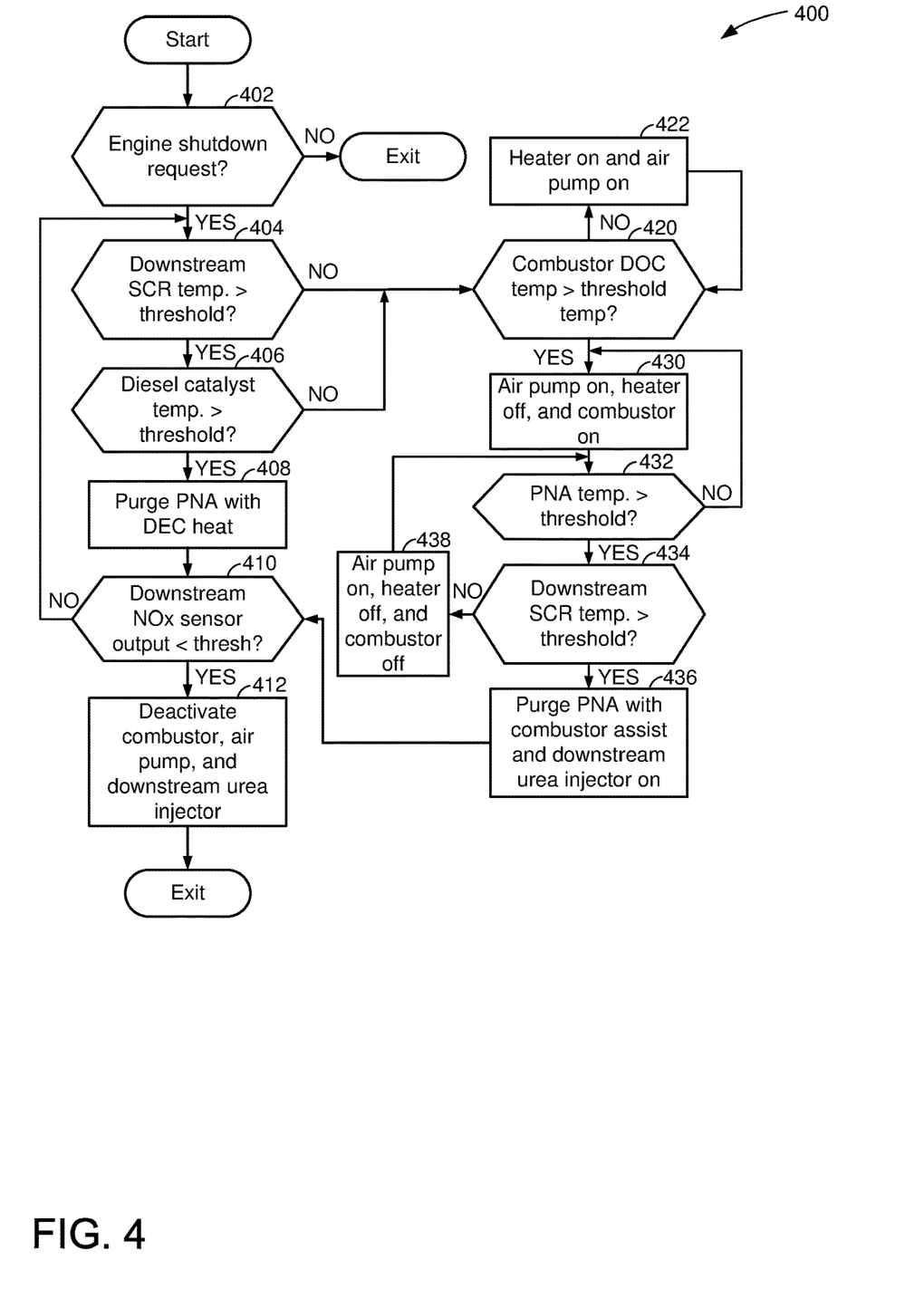
FIG. 4 shows a flowchart of a method for preparing an engine exhaust system for engine restarting.
Figure 5:
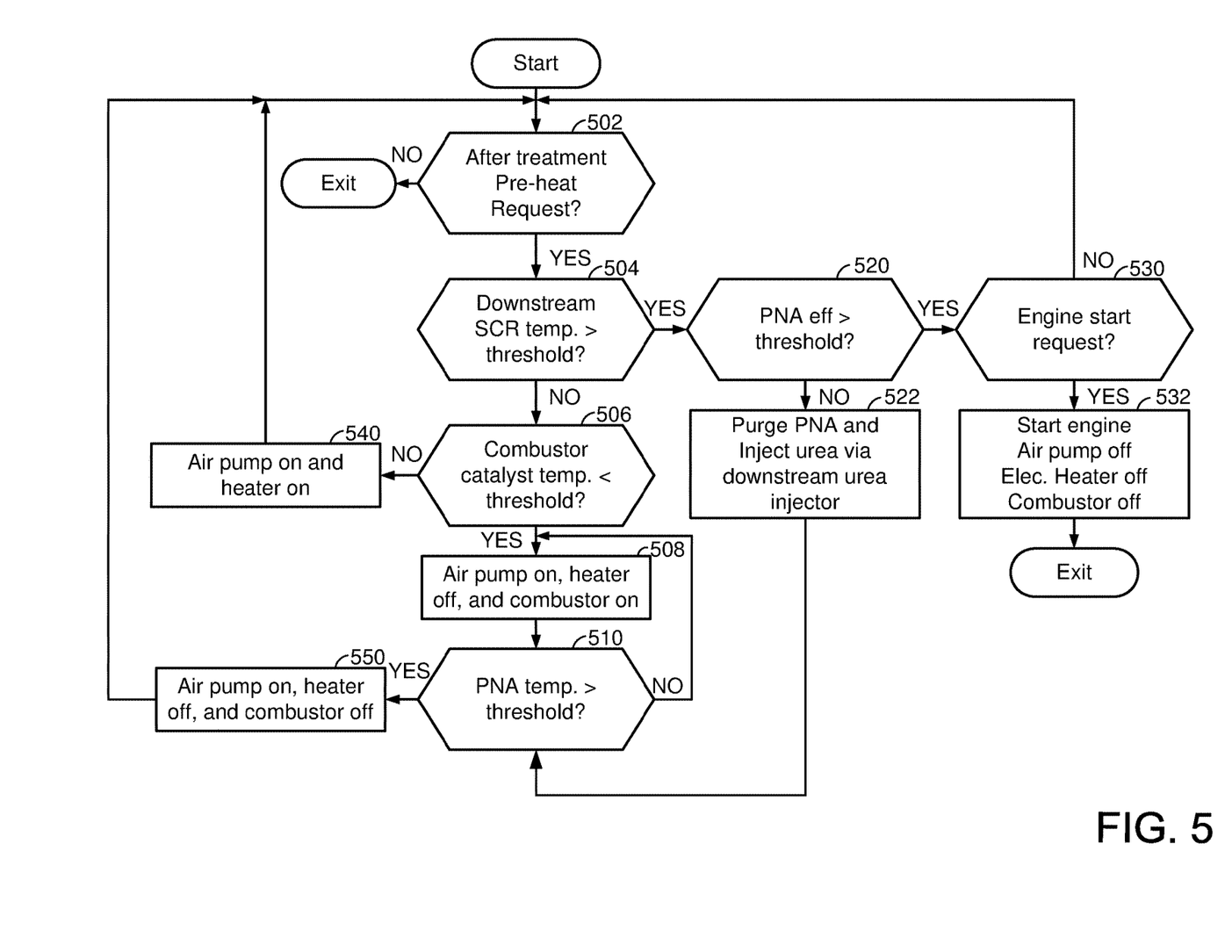
FIG. 5 shows a flowchart of a method for starting an engine.

The present description is related to operating an engine and exhaust system after treatment devices during engine shutdown and in preparation for a cold engine start. An example engine is shown in FIG. 1. An example exhaust system for the engine of FIG. 1 is shown in FIG. 2. An example operating sequence according to the method of FIG. 4 and the systems of FIGS. 1 and 2 is shown in FIG. 3. FIGS. 4 and 5 show methods for operating the engine and after treatment system that includes a PNA.

Referring to FIG. 1, internal combustion engine 10, comprising a plurality of cylinders, one cylinder of which is shown in FIG. 1, is controlled by electronic engine controller 12. The controller 12 receives signals from the various sensors of FIGS. 1 and 2. The controller 12 also employs the various actuators of FIGS. 1 and 2 to adjust engine and vehicle operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59. Likewise, exhaust poppet valve 54 may be operated by a variable valve activating/deactivating actuator 58. Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, low pressure fuel pump (not shown), high pressure fuel pump 21, fuel pump volume control valve 25, and fuel rail (not shown).

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started. Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes 166 are in a closed position. Alternatively, waste gate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of turbine variable vane control actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet 17 of compressor 162, work performed on the air may be increased, thereby increasing the temperature of the air. Optional electric machine 165 is also shown coupled to shaft 161. Optional electric machine 165 may rotate compressor 162 when engine 10 is not rotating, when engine 10 is rotating at low speed (e.g., cranking speed such as 250 RPM), or when exhaust energy is low to provide additional boost. Air flows into engine 10 in the direction of arrows 5.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a band or chain. In one example, starter 96 is in a base state when not engaged to the engine crankshaft. An engine start/stop may be requested via human/machine interface (e.g., key switch, pushbutton, remote radio frequency emitting device, etc.) 69 or in response to vehicle operating conditions (e.g., foot lever position, driver demand pedal position, battery SOC, etc.). Battery 8 may supply electrical power to starter 96 and electric machine 165. Controller 12 may monitor battery state of charge.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. In some examples, a universal Exhaust Gas Oxygen (UEGO) sensor 126 may be coupled to exhaust manifold 48 upstream of engine after treatment device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber 30 next to sprayed fuel, it may be easier to ignite the fuel spray plume in the cylinder, releasing heat that propagates throughout the cylinder, raising the temperature in the combustion chamber, and enhance combustion. Cylinder pressure may be measured via optional pressure sensor 67, alternatively or in addition, sensor 67 may also sense cylinder temperature.

In one example, engine after treatment device 71 may be a selective catalytic reduction catalyst (SCR), which may be referred to as an upstream SCR. Engine after treatment device 72 may be an oxidation catalyst or a three-way catalyst, which may be referred to as a diesel emission catalyst. Engine after treatment device 73 may be a passive NOx absorber (PNA), which may be is comprised of palladium-exchanged zeolites. Engine after treatment device 74 may be a SCR, which may be referred to as a downstream SCR. Exhaust flows in the direction of arrow 7. A combustor system 199 may supply heated air to after treatment devices via passage or conduit 198 upstream of engine after treatment devices 71-74 and downstream of turbine 164. Passage or conduit 198 may merge into exhaust passage or conduit 185.

Exhaust gas recirculation (EGR) may be provided to the engine via high pressure EGR system 83. High pressure EGR system 83 includes EGR valve 80, EGR passage 81, and EGR cooler 85. EGR valve 80 is a valve that closes or allows exhaust gas to flow from upstream of engine after treatment device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of engine after treatment device 71 to a location upstream of compressor 162. Low pressure EGR system 75 may include an EGR cooler 89.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a driver demand pedal 130 for sensing driver demand pedal position adjusted by human foot 132; a measurement of engine manifold pressure (MAP) from pressure sensor 121 coupled to intake manifold 44 (alternatively or in addition pressure sensor 121 may sense intake manifold temperature); boost pressure from pressure sensor 122 exhaust gas oxygen content from oxygen sensor 126; an engine position sensor from an engine position sensor 118 sensing crankshaft 40 position; a measurement of air mass entering the engine from sensor 120 (e.g., a hot wire air flow meter); and a measurement of throttle position from sensor 60. Barometric pressure may also be sensed (sensor not shown) for processing by controller 12. In a preferred aspect of the present description, engine position sensor 118 produces a predetermined number of equally spaced pulses each revolution of the crankshaft from which engine speed (RPM) can be determined.

Controller 12 may receive data and requests from a remote device 86 that is external to the vehicle that the controller and engine are a part of. Remote device 86 may be a key fob, cloud server, phone, or other device. The requests may include an engine cold start preparation request, engine start request, and so on.

During operation, each cylinder within engine 10 typically undergoes a four-stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Referring now to FIG. 2, a detailed schematic view of combustor system 199 is shown. Electrical connections are shown via dashed lines. Components including conduits or passages are shown via solid lines. Fluidic communication may take place between connected conduits or passages. Combustor system 199 may supply heated air and/or combustion gases to heat engine after treatment devices 71-74. Controller 12 may adjust operating states of valves, injectors, pumps, an igniter, and combustors to operate the combustor system 199.

Combustor system includes a combustor air pump 202 that supplies fresh air to combustor 208 via first passage 250 and combustor flow control valve 204. Bypass passage or conduit 252 is arranged in parallel with passage or conduit 250. The passage or conduit 252 allows fresh air to be mixed with output gases of combustor 208, thereby controlling the temperature of gases that flow to three-way valve 210. In this way, passage or conduit 252 allows dilution and cooling of gases that exit combustor 208. Bypass flow control valve 203 controls air flow though bypass passage 252. The combustor flow control valve 204 and bypass flow control valve 203 may be cycled open and closed (e.g., modulated) to control air flow into combustor 208 and dilution/cooling of gases exiting combustor 208 before the gasses flow through three-way valve 210.

The combustor system of FIG. 2 offers the advantage of adjusting a temperature of gases entering three-way valve 210 via controlling mixing of fresh air flow from combustor air pump 202 with combustion gases that are exiting combustor 208. This may be beneficial to control a temperature of combustor after treatment device 214 (e.g., a combustor oxidation catalyst) when combustor 208 is activated (e.g., combusting fuel to generate heat).

Fuel injector 206 may provide fuel to combustor 208 for mixing with air that may be supplied via combustor air pump 202. Igniter 207 may initiate combustion within combustor 208. Air or a combination of air and combustion gases may be delivered to three-way valve 210. Three-way valve 210 may be closed in a first position so that flow through after treatment bypass passage or conduit 254 and through combustor after treatment passage or conduit 252 is prevented. Three-way valve 210 may deliver the air and/or combustion gases to passage or conduit 252 and not passage or conduit 254 when three-way valve 210 is in a second position. Three-way valve 210 may deliver air and/or combustion gases to passage or conduit 254 and not passage or conduit 252 when three-way valve 210 is in a third position.

Passage or conduit 253 may be referred to as a combustor after treatment bypass passage or conduit. Air or combustor byproducts may be directed through bypass passage or conduit 253 and not through combustor after treatment passage or conduit 254 during conditions where temperatures of engine after treatment devices 71-74 exceed their light-off temperatures, but where heat output of the engine is low and may not sustain temperatures of engine after treatment devices 71-74. Electric heater 212 and combustor after treatment device 214 (e.g., a diesel oxidation catalyst or three-way catalyst) are located along passage or conduit 252. Combustor after treatment device 214 may be referred to combustor after treatment device (e.g., combustor oxidation catalyst) since it is configured to process combustor gases whereas engine after treatment devices 71-74 may be referred to as engine after treatment devices since they are configured to process engine exhaust gases. Passage or conduit 252 and passage or conduit 253 combine or merge into passage or conduit 198 before entering exhaust passage or conduit 185. Passage 252 may be provided to reduce a possibility of combustor catalyst degradation when combustor 208 is operating under high power/warm exhaust conditions.

Exhaust passage or conduit 185 includes an upstream urea injector 236, an upstream NOx sensor 237, a downstream urea injector 238, and a downstream NOx sensor 239. Urea injector 236 may supply urea 240 to engine after treatment device 71 (e.g., an upstream SCR catalyst), which may be referred to as an engine selective catalytic reduction catalyst since it is configured to reduce NOx from engine 10. Urea injector 238 may supply urea 240 to engine after treatment device 74 (e.g. a downstream SCR catalyst), which may also be referred to as an engine selective catalytic reduction catalyst. The passages or conduits are arranged to place combustor system 199 in parallel with engine 10. Exhaust gases and combustor gases flow in the directions indicated by the arrows that are placed along the passages or conduits.

Temperature sensors 280-284 indicate temperatures of combustor after treatment device 214, engine after treatment device 73 (e.g., a PNA), and engine after treatment device 74 (e.g., downstream SCR). Alternatively, or in addition, temperatures of devices within engine exhaust passage 185 and combustor system 199 may be inferred.

The system of FIGS. 1 and 2 provides for an exhaust system for an internal combustion engine, comprising: a combustor air pump selectively supplying air to a combustor positioned along a first passage; a combustor positioned along the first passage downstream of the combustor air pump; a second passage arranged in parallel with the first passage; a three-way valve coupled to the first passage and the second passage downstream of the combustor; a third passage positioned downstream of the three-way valve; a fourth passage positioned in parallel with the third passage, the third passage and the fourth passage fluidically coupled to a fifth passage, the fifth passage fluidically coupled to an engine exhaust passage; a passive NOx absorber (PNA) positioned along the engine exhaust passage; a selective catalyst reduction (SCR) catalyst positioned along the engine exhaust passage downstream of the PNA; and a NOx sensor positioned along the engine exhaust passage downstream of the SCR. In a first example, the exhaust system includes where the PNA is comprised of palladium-exchanged zeolites. In a second example that may include the first example, the exhaust system further comprises: an electric heater positioned along the fourth passage; and an oxidation catalyst positioned along the fourth passage downstream of the electric heater. In a third example that may include one or both of the first and second examples, the exhaust system further comprises a urea injector positioned along the engine exhaust system downstream of the PNA and upstream of the SCR. In a fourth example that may include one or more of the first through third examples, the exhaust system further comprises: a first flow control valve positioned along the first passage upstream of the combustor; and a second flow control valve positioned along the second passage. In a fifth example that may include one or more of the first through fourth examples, the exhaust system further comprises a diesel emissions catalyst positioned along the engine exhaust passage upstream of the PNA. In a sixth example that may include one or more of the first through fifth examples, the exhaust system further comprises a second SCR positioned along the engine exhaust passage upstream of the PNA. In a seventh example that may include one or more of the first through sixth examples, the exhaust system further comprises a urea injector positioned along the engine exhaust passage upstream of the second SCR.

Referring now to FIG. 3, an example prophetic vehicle operating sequence for a system from FIGS. 1 and 2 that is operated according to the method of FIG. 4 is shown. The operating sequence of FIG. 3 may be produced via one of the system of FIGS. 1 and 2 and executing instructions of the method described in FIG. 4. The plots of FIG. 3 are aligned in time and occur at the same time. Vertical markers at t0-t5 indicate times of particular interest during the sequence.

The first plot from the top of FIG. 3 is a plot of engine operating state versus time. The vertical axis represents the engine operating state and the engine is activated (e.g., combusting fuel and rotating) when trace 302 is at a higher level near the vertical axis arrow. The engine is not activated when trace 302 is at a lower level near the horizontal axis. The horizontal axis represents time and time increases from the left side of the figure to the right side of the figure. Trace 302 represents the engine operating state.

The second plot from the top of FIG. 3 is a plot of a downstream SCR temperature versus time. The vertical axis represents downstream SCR temperature and downstream SCR temperature increases in the direction of the vertical axis arrow. The horizontal axis represents time and time increases from the left side of the figure to the right side of the figure. Trace 304 represents the downstream SCR temperature. Dashed line 350 represents a threshold downstream SCR temperature, such as a downstream SCR light-off temperature, where a light-off temperature is a temperature at which the after treatment device exhibits a threshold efficiency (e.g., 50 mol % conversion efficiency for a particular gas species).

The third plot from the top of FIG. 3 is a plot of combustor diesel oxidation catalyst (DOC) temperature versus time. The vertical axis represents the combustor DOC temperature and the combustor DOC temperature increases in the direction of the vertical axis arrow. The horizontal axis represents time and time increases from the left side of the figure to the right side of the figure. Trace 306 represents the combustor DOC temperature. Dashed line 352 represents a threshold combustor DOC temperature, where a light-off temperature is a temperature at which the combustor DOC exhibits a threshold efficiency (e.g., 50 mol % conversion efficiency for NOx).

The fourth plot from the top of FIG. 3 is a plot of passive NOx absorber (PNA) temperature versus time. The vertical axis represents PNA temperature and PNA temperature increases in the direction of the vertical axis arrow. The horizontal axis represents time and time increases from the left side of the plot to the right side of the plot. Horizontal dashed line 354 represents a PNA purge temperature (e.g., a temperature at which the PNA releases stored NOx).

The fifth plot from the top of FIG. 3 is a plot of electric heater operating state versus time. The vertical axis represents the electric heater operating state and the electric heater is activated when trace 312 is at a higher level near the vertical axis arrow. The electric heater is not activated when trace 312 is at a lower level near the horizontal axis. The horizontal axis represents time and time increases from the left side of the figure to the right side of the figure. Trace 312 represents the electric heater operating state.

The sixth plot from the top of FIG. 3 is a plot of combustor operating state versus time. The vertical axis represents the combustor operating state and the combustor is activated (e.g., combusting fuel and generating heat) when trace 314 is at a higher level near the vertical axis arrow. The combustor is not activated when trace 314 is at a lower level near the horizontal axis. The horizontal axis represents time and time increases from the left side of the figure to the right side of the figure. Trace 314 represents the combustor operating state.

The seventh plot from the top of FIG. 3 is a plot of urea injector operating state versus time. The vertical axis represents the urea injector operating state and the urea injector is activated (e.g., injecting urea) when trace 316 is at a higher level near the vertical axis arrow. The urea injector is not activated when trace 316 is at a lower level near the horizontal axis. The horizontal axis represents time and time increases from the left side of the figure to the right side of the figure. Trace 316 represents the urea injector operating state.

The eighth plot from the top of FIG. 3 is a plot of combustor air pump operating state versus time. The vertical axis represents the combustor air pump state and the combustor air pump is activated when trace 318 is at a higher level near the vertical axis arrow. The combustor air pump is not activated when trace 318 is at a lower level near the horizontal axis. The horizontal axis represents time and time increases from the left side of the figure to the right side of the figure. Trace 318 represents the combustor air pump operating state.

The ninth plot from the top of FIG. 3 is a plot of downstream NOx content in exhaust gases versus time. The vertical axis represents downstream NOx content and downstream NOx content increases in the direction of the vertical axis arrow. The horizontal axis represents time and time increases from the left side of the plot to the right side of the plot. Horizontal dashed line 356 represents a threshold NOx content level in exhaust gases.

At time t0, the engine is running (e.g., rotating and combusting fuel) and the downstream SCR temperature is low. The combustor DOC temperature is also low and the PNA temperature is low. The electric heater is not activated and the combustor is not activated. Further, the urea injector is not activated and the combustor air pump is not activated. The downstream NOx content is low. Such operating conditions may be indicative of operating the engine at a low load and low speed for a period of time.

At the time t1, the engine is deactivated and the remaining operating states are unchanged. However, shortly after time t1, at time t2, the electric heater and the combustor air pump are activated to begin purging of NOx from the PNA. The electric heater is activated in response to the downstream SCR temperature being less than threshold 350 and combustor DOC temperature being less than temperature threshold 352. The combustor remains deactivated and the urea injector remains deactivated. The downstream NOx content is at a lower level since the engine is deactivated.

At time t3, the engine remains off and the combustor DOC temperature reaches its threshold temperature. Therefore, the electric heater is deactivated and the combustor is activated to increase the rate of engine PNA heating to facilitate purging of NOx from the PNA. The combustor air pump remains on and the downstream SCR and the combustor DOC temperatures continue to increase. The urea injector remains off and the PNA temperature remains below threshold 354. The downstream NOx content remains low.

At time t4, the engine remains off and the PNA temperature exceeds its threshold temperature 356. Therefore, the combustor is deactivated, yet the combustor air pump remains active to continue to move heat toward the PNA and downstream SCR. The urea injector is activated to enable NOx reduction by the downstream SCR. The PNA begins to release NOx The combustor DOC temperature and the downstream SCR temperature remain above their respective thresholds. The downstream NOx content increases above its threshold 358.

At time t5, the downstream NOx content upstream of the downstream SCR falls below threshold 356. Therefore, the PNA NOx purge cycle begins to end. In particular, the urea injector is deactivated and the combustor air pump is deactivated. The engine remains off and the combustor DOC temperature continues to decline.

Thus, a PNA may be purged of NOx in response to an engine shutdown request so that the PNA may be ready or prepared to absorb or store NOx during a subsequent engine restart. The PNA NOx purge may be performed after the engine is stopped (e.g., not rotating and not combusting fuel) by heating the PNA via the electric heater and/or the combustor.

Referring now to FIG. 4, a method for operating an engine and purging a PNA is shown. The method of FIG. 4 may be at least partially implemented as executable instructions stored in memory of one or more controllers in the system of FIGS. 1 and 2. Further, the method of FIG. 4 may include actions taken in the physical world by a controller to transform an operating state of the system of FIGS. 1 and 2. Additionally, the method of FIG. 4 may provide at least portions of the operating sequence shown in FIG. 3. Method 400 may begin when an engine of a vehicle is running (e.g., combusting fuel and rotating).

At 402, method 400 judges whether or not there has been a request to shut down the engine (e.g., a request to stop engine operation). If so, the answer is yes and method 400 proceeds to 404. Otherwise, the answer is no and method 400 proceeds to exit. In one example, a request to shut down the engine may be generated via applying a pushbutton, leaving proximity of the vehicle, or via a key or other device.

At 404, method 400 judges whether or not a temperature of a downstream SCR (e.g., a downstream SCR temperature) is greater than a threshold temperature. If so, the answer is yes and method 400 proceeds to 406. Otherwise, the answer is no and method 400 proceeds to 420.

At 406, method 400 judges whether or not a diesel emissions catalyst (e.g., an after treatment device 72 of FIG. 2 (e.g., an oxidation catalyst)) is greater than a threshold temperature. If so, the answer is yes and method 400 proceeds to 408. Otherwise, the answer is no and method 400 proceeds to 420.

At 408, method 400 purges the PNA of NOx via heat from the diesel emissions catalyst (e.g., 72 of FIG. 2). In particular, method 400 activates the combustor air pump if the air pump is not active. The combustor is deactivated (e.g., not combusting fuel and fuel injection to the combustor is deactivated). Method 400 may also adjust valves 204, 203, and 210 so that air flows from the combustor air pump 202 to the exhaust passage 185. The air may flow though passage 252 and passage 253. Alternatively, the air may flow through passage 250 and passage 254 on its way to exhaust passage 185. Since the engine was recently running, heat from the diesel emissions catalyst (e.g., 72 of FIG. 2), may be scavenged and directed to the PNA (e.g., 73 of FIG. 2). The downstream urea injector 238 may also be activated so that NOx may be reduced via the engine after treatment device 74 (e.g., downstream SCR) to $N_2$ and $H_2O$. The heat from the diesel emissions catalyst may cause NOx to be released from the PNA and converted via the downstream SCR. Method 400 proceeds to 410.

At 410, method 400 judges whether or not NOx sensed via the downstream NOx sensor (e.g., 239) is less than a threshold NOx level. If so, the answer is yes and method 400 proceeds to 412. Otherwise, the answer is no and method 400 returns to 404.

At 412, method 400 deactivates the combustor (e.g., ceases injecting fuel to the combustor), deactivates the combustor air pump, and deactivates the downstream urea injector to stop urea injection. The NOx is purged from the PNA so the combustor may be deactivated to conserve fuel and the combustor air pump and urea injector may be deactivated to conserve electric energy and urea. Valves 203, 204, and 210 may also be adjusted to prevent flow through passage 198 of FIG. 2. Method 400 proceeds to exit.

At 420, method 400 judges whether or not a temperature of the combustor DOC (e.g., a combustor DOC temperature) is greater than a threshold DOC temperature (e.g., a DOC light-off temperature). If so, the answer is yes and method 400 proceeds to 430. Otherwise, the answer is no and method 400 proceeds to 422.

At 422, method 400 activates the heater (e.g., 212 of FIG. 2) and the combustor air pump (e.g., 202 of FIG. 2). The combustor is deactivated. By activating the heater and activating the combustor air pump, the diesel oxidation catalyst (e.g., 214 of FIG. 2), downstream SCR, and PNA may be heated. Further, the upstream SCR, diesel emissions catalyst (e.g., 72 of FIG. 2), and the PNA (e.g., 73 of FIG. 2) may be prepared to process emissions from the combustor. In addition, valves 204 and 210 may be positioned to allow air flow through passage 254 and not through passage 253 so that the oxidation catalyst may reach its threshold temperature (e.g., light-off temperature) sooner. Method 400 returns to 420.

At 430, method 400 activates the combustor air pump, deactivates the heater, and activates the combustor. The combustor may be activated by supplying fuel to the combustor and igniting an air-fuel mixture in the combustor via an ignitor. Valves 204, 203, and 210 may be adjusted to flow air from combustor air pump 202 to combustor 208 and to combustor after treatment device 214 without flowing air through passage 253 and passage 252. The downstream and upstream urea injectors are also deactivated. Method 400 proceeds to 432.

At 432, method 400 determines whether or not a temperature of the PNA (e.g., 73 of FIG. 2) is greater than a threshold PNA NOx storage temperature (e.g., a maximum desired NOx storage temperature). If so, the answer is yes and method 400 proceeds to 434. Otherwise, the answer is no and method 400 returns to 430. This decision allows the PNA to reach and maintain the PNA at the maximum desired NOx storage temperature so that the downstream SCR may be brought up to operating temperature without purging NOx from the PNA.

At 434, method 400 judges whether or not a temperature of a downstream SCR (e.g., a downstream SCR temperature) is greater than a threshold temperature. If so, the answer is yes and method 400 proceeds to 436. Otherwise, the answer is no and method 400 proceeds to 438.

At 438, method 400 leaves the air pump on and shuts off the combustor and the heater so that heat from upstream devices may be transferred to the downstream SCR. Method 400 returns to 432.

At 436, method 400 purges NOx from the PNA. Method 400 may activate the downstream urea injector and supply urea to the downstream SCR before and while NOx is being released from the PNA. The combustor remains activated and method 400 proceeds to 410.

In this way, method 400 may purge NOx from a PNA in response to an engine stop so that the PNA may be ready to absorb NOx during a subsequent engine restart. The PNA may be first warmed by an electric heater and then by a combustor after a diesel oxidation catalyst reaches its light-off temperature so that combustor emissions may be processed. Thus, the electric heater may make processing of combustor emissions more likely, thereby reducing tail pipe emissions during purging of the PNA.

Referring now to FIG. 5, a method for pre-heating an engine after treatment system is shown. The method of FIG. 5 may be at least partially implemented as executable instructions stored in memory of one or more controllers in the system of FIGS. 1 and 2. Further, the method of FIG. 5 may include actions taken in the physical world by a controller to transform an operating state of the system of FIGS. 1 and 2. Method 500 may begin when an engine of a vehicle is stopped and not rotating.

At 502, method 500 judges whether or not there has been a request to pre-heat the engine after treatment devices (e.g., 71-74 of FIG. 1). If so, the answer is yes and method 500 proceeds to 504. Otherwise, the answer is no and method 500 proceeds to exit. In one example, a request to pre-heat the engine after treatment system may be generated in preparation of vehicle activation. The request to pre-heat the engine after treatment device may be generated by a vehicle operator, cloud server, or other device. For example, the request to pre-heat the engine after treatment device may be generated in response to a person or device entering the proximity of the device or according to a scheduled vehicle departure time.

At 504, method 500 judges whether or not a downstream SCR temperature (e.g., a temperature of a downstream SCR) is greater than a threshold temperature (e.g., a catalyst light-off temperature or a SCR light-off temperature). If so, the answer is yes and method 500 proceeds to 520. If not, the answer is no and method 500 proceeds to 506.

At 520, method 500 judges whether or not PNA NOx storage efficiency is greater than a threshold efficiency. If method 500 judges that PNA NOx storage efficiency is greater than the threshold efficiency, the answer is yes and method 500 proceeds to 530. Otherwise, the answer is no and method 500 proceeds to 522. In one example, method 500 may estimate the PNA NOx storage efficiency by subtracting the amount of NOx flowing out of the PNA from the amount of NOx flowing into the PNA over a time interval and dividing the result by the total amount of NOx flowing into the PNA over the time interval. The amount of NOx flowing into and out of the PNA may be determined via output of upstream and downstream NOx sensors.

At 522, method 500 purges NOx from the PNA and injects urea via the downstream urea injector. During these conditions, the PNA may be filled with NOx and NOx may be slipping past the PNA and to the downstream SCR. The combustor may have raised the temperature of the combustor oxidation catalyst above its light-off temperature and the temperature of the downstream SCR above its light-off temperature. The NOx that is purged by the PNA may be processed by the downstream SCR into $N_2$ and $H_2O$. To achieve NOx purging of the PNA, method 500 adjusts flow control valve 203 to reduce dilution air (e.g. richen the combustor air-fuel mixture) and increase the temperature of gases exiting the combustor. These actions may increase PNA temperature above the PNA light-off temperature. The downstream urea injector injects urea upstream of the downstream SCR. PNA NOx purging ceases when the downstream NOx sensor output is less than a threshold NOx value. Once the PNA NOx purging ceases, the combustor is deactivated by ceasing fuel flow to the combustor. The downstream urea injector is also deactivated. This allows the PNA temperature to fall so that the PNA may store NOx again. Method 500 proceeds to 510.

At 530, method 500 judges whether or not there is an engine start request. If so, the answer is yes and method 500 proceeds to 532. If not, the answer is no and method 500 returns to 502. An engine start request may be received from a remote device, a pushbutton, or a remote server.

At 532, method 500 starts the engine via rotating the engine and supplying fuel to the engine. Method 500 deactivates the combustor air pump, deactivates the electric heater, and deactivates the combustor. Method 500 proceeds to exit.

At 506, method 500 judges whether or not a combustor oxidation catalyst has reached or exceeded its light-off temperature. If so, the answer is yes and method 500 proceeds to 508. Otherwise, the answer is no and method 500 proceeds to 540.

At 540, method 500 activates the combustor air pump and the electric heater. Method 500 may also adjust the positions of valves 203, 204, and 210 to allow flow through combustor 208 and combustor after treatment device 214. Flow through passage 252 and passage 253 is prevented. These actions allow scavenging of heat if combustor 208 is warm and to light-off combustor after treatment device 214. Method 500 returns to 502.

At 508, method 500 activates the combustor air pump, activates the combustor (e.g., supplies fuel to the combustor and operates the igniter), and deactivates the electric heater. Method 500 may also adjust the positions of valves 203, 204, and 210 to allow flow through combustor 208, prevent flow through passage 254, and adjust flow through passage 251 so that a temperature of combustor after treatment device 214 is within a specified temperature range. Method 500 proceeds to 510.

At 510, method 500 determines whether or not a temperature of the PNA (e.g., 73 of FIG. 2) is greater than a threshold PNA NOx storage temperature (e.g., a maximum desired NOx storage temperature). If so, the answer is yes and method 500 proceeds to 550. Otherwise, the answer is no and method 500 returns to 508. This decision allows the PNA to reach and maintain the PNA at the maximum desired NOx storage temperature so that the downstream SCR may be brought up to operating temperature without purging NOx from the PNA.

At 550, activates the combustor air pump, deactivates the combustor (e.g., does not supply fuel and igniter to the combustor), and deactivates the electric heater. Method 500 may also adjust the positions of valves 203, 204, and 210 to allow flow through combustor 208 by opening valve 204, prevent flow through passage 253, closes valve 203 to prevent flow through passage 252, and adjust valve 210 to allow flow through passage 254. The PNA temperature is sufficient to purge NOx from the PNA and convert the NOx via the downstream SCR. Method 500 returns to 502.

In this way, method 500 may activate emissions devices of an engine after treatment system so that tailpipe emissions may be reduced. Method 500 may begin by activating an electric heater to bring an oxidation catalyst up to a working temperature. The oxidation catalyst may process emissions from a combustor and the combustor may heat engine after treatment devices to reduce tailpipe emissions.

Thus, the methods of FIGS. 4 and 5 provide for a method for operating an engine, comprising: via a controller, activating a combustor air pump and an electric heater in response to a request to pre-heat an exhaust after treatment system of the engine while a downstream selective catalytic reduction (SCR) catalyst temperature is less than a threshold and a combustor catalyst temperature is less than a second threshold; and via the controller, deactivating the electric heater and activating a combustor in response to the combustion catalyst temperature exceeding the second threshold. In a first example, the method includes where activating the combustor includes supplying fuel to the combustor. In a second example that may include the first example, the method further comprises deactivating the combustor in response to a passive NOx absorber (PNA) temperature exceeding a third threshold. In a third method that may include one or both of the first and second methods, the method further comprises starting an engine in response to a NOx storage efficiency of the PNA exceeding a fourth threshold. In a fourth method that may include one or more of the first through third methods, the method further comprises purging the PNA of NOx in response to the NOx storage efficiency of the PNA being less than the fourth threshold. In a fifth method that may include one or more of the first through fourth methods, the method includes where the electric heater is in a passage downstream of the combustor air pump. In a sixth method that may include one or more of the first through fifth methods, the method further comprises processing combustion products output from the combustor via an oxidation catalyst and delivering processed combustion products output from the oxidation catalyst to an exhaust system.

The methods of FIGS. 4 and 5 also provide for a method for operating an engine, comprising: via a controller, activating a combustor air pump and an electric heater in response to a request to post-heat (e.g., heat the after treatment system following an engine stop and prior to engine start and an indication of an engine start) an exhaust after treatment system of the engine while a downstream selective catalytic reduction (SCR) catalyst temperature is less than a threshold and a combustor catalyst temperature is less than a second threshold; via the controller, deactivating the electric heater and activating a combustor in response to the combustor catalyst temperature exceeding the second threshold; and purging a passive NOx absorber (PNA) via activating the combustion air pump in response to an engine shutdown request. In a first example, the method further comprises: activating an electric heater and a combustor air pump in response to the SCR catalyst temperature being less than a third threshold to purge the PNA. In a second example that may include the first example, the method further comprises deactivating the electric heater and activating the combustor to purge the PNA in response to an oxidation catalyst temperature being greater than a fourth threshold. In a third example that may include one or both of the first and second examples, the method further comprises deactivating the combustor and the combustor air pump in response to output of a NOx sensor. In a fourth example that may include one or more of the first through third examples, the method includes where the NOx sensor is positioned downstream of the PNA.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust system for an internal combustion engine, comprising:
    a combustor air pump selectively supplying air to a combustor positioned along a first passage;
    a second passage arranged in parallel with the first passage;
    a three-way valve coupled to the first passage and the second passage downstream of the combustor;
    a third passage positioned downstream of the three-way valve;
    a fourth passage positioned in parallel with the third passage, the third passage and the fourth passage fluidically coupled to a fifth passage, the fifth passage fluidically coupled to an engine exhaust passage;
    a passive NOx absorber (PNA) positioned along the engine exhaust passage;
    a selective catalyst reduction (SCR) catalyst positioned along the engine exhaust passage downstream of the PNA; and
    a NOx sensor positioned along the engine exhaust passage downstream of the SCR.

2. The exhaust system of claim 1, where the PNA is comprised of palladium-exchanged zeolites.

3. The exhaust system of claim 1, further comprising:
    an electric heater positioned along the fourth passage; and
    an oxidation catalyst positioned along the fourth passage downstream of the electric heater.

4. The exhaust system of claim 1, further comprising a urea injector positioned along the engine exhaust passage downstream of the PNA and upstream of the SCR.

5. The exhaust system of claim 1, further comprising:
    a first flow control valve positioned along the first passage upstream of the combustor; and
    a second flow control valve positioned along the second passage.

6. The exhaust system of claim 1, further comprising a diesel emissions catalyst positioned along the engine exhaust passage upstream of the PNA.

7. The exhaust system of claim 6, further comprising a second SCR positioned along the engine exhaust passage upstream of the PNA.

8. The exhaust system of claim 7, further comprising a urea injector positioned along the engine exhaust passage upstream of the second SCR.

* * * * *